(12) United States Patent
Ganesan (10) Patent No.: US 10,284,549 B2
(45) Date of Patent: *May 7, 2019

(54) METHOD FOR SECURE USER AND TRANSACTION AUTHENTICATION AND RISK MANAGEMENT

(71) Applicant: Early Warning Services, LLC, Scottsdale, AZ (US)

(72) Inventor: Ravi Ganesan, San Diego, CA (US)

(73) Assignee: Early Warning Services, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/015,592

(22) Filed: Feb. 4, 2016

(65) Prior Publication Data

US 2016/0156620 A1 Jun. 2, 2016

Related U.S. Application Data

(63) Continuation of application No. 14/330,025, filed on Jul. 14, 2014, now Pat. No. 9,325,702, which is a
(Continued)

(51) Int. Cl.
*H04L 29/06* (2006.01)
*H04L 9/32* (2006.01)

(52) U.S. Cl.
CPC ........ *H04L 63/0838* (2013.01); *H04L 9/3215* (2013.01); *H04L 9/3228* (2013.01);
(Continued)

(58) Field of Classification Search
CPC ... H04L 63/083; H04L 63/0815; H04L 63/08; H04L 63/102; H04L 9/3215; H04L 9/3228; G06F 21/31
(Continued)

(56) References Cited

U.S. PATENT DOCUMENTS 5,874,918 A 2/1999 Czarnecki et al.
5,930,474 A 7/1999 Dunworth et al.
(Continued)

FOREIGN PATENT DOCUMENTS

EP 1 936 528 A1 6/2008
JP 11-338933 12/1999
(Continued)

OTHER PUBLICATIONS

Extended European Search Report issued in European Application No. 11737535.2 dated Dec. 3, 2014.
(Continued)

*Primary Examiner* — Farid Homayounmehr
*Assistant Examiner* — Sanchit K Sarker
(74) *Attorney, Agent, or Firm* — Kilpatrick Townsend & Stockton LLP; Torrey Devon Spink (57) ABSTRACT

To provide a user signature on a network transaction, a security server receives transaction information representing a transaction between a network user and a network site, such as a website, directly from the network site. The security server calculates a one-time-password based on the received transaction information and a secret shared by the security server and the network site, but not by the user. The security server transmits the calculated one-time-password for application as the user's signature on the transaction. The one-time-password is independently calculable by the network site based on the shared secret.

20 Claims, 5 Drawing Sheets

Related U.S. Application Data continuation of application No. 13/011,739, filed on Jan. 21, 2011, now Pat. No. 8,806,592, which is a continuation-in-part of application No. 13/011,587, filed on Jan. 21, 2011, now Pat. No. 8,789,153.

(60) Provisional application No. 61/298,551, filed on Jan. 27, 2010.

(52) U.S. Cl.
CPC ............ *H04L 63/18* (2013.01); *H04L 63/20* (2013.01); *H04L 2463/082* (2013.01)

(58) Field of Classification Search
USPC ....................................................... 76/2–6, 8
See application file for complete search history.

(56) References Cited

U.S. PATENT DOCUMENTS

| | | | |
|---|---|---|---|
| 6,151,631 A | 11/2000 | Ansell et al. | |
| 6,249,252 B1 | 6/2001 | Dupray | |
| 6,684,250 B2 | 1/2004 | Anderson et al. | |
| 6,748,367 B1 | 6/2004 | Lee | |
| 6,947,978 B2 | 9/2005 | Huffman et al. | |
| 7,100,204 B1 | 8/2006 | Myllymaki et al. | |
| 7,194,354 B1 | 3/2007 | Oran et al. | |
| 8,136,148 B1 | 3/2012 | Chayanam et al. | |
| 8,341,236 B1 | 12/2012 | Ganesan et al. | |
| 8,438,382 B2 | 5/2013 | Ferg | |
| 8,490,168 B1 | 7/2013 | Holloway et al. | |
| 8,549,601 B2 | 10/2013 | Ganesan et al. | |
| 8,589,459 B1 | 11/2013 | Ganesan et al. | |
| 2002/0095507 A1 | 7/2002 | Jerdonek | |
| 2003/0028451 A1* | 2/2003 | Ananian | G06F 17/30867 705/26.42 |
| 2004/0030924 A1 | 2/2004 | Mizoguchi et al. | |
| 2004/0210536 A1 | 10/2004 | Gudelj et al. | |
| 2004/0225878 A1 | 11/2004 | Costa-Requena et al. | |
| 2004/0242238 A1 | 12/2004 | Wang et al. | |
| 2005/0071417 A1 | 3/2005 | Taylor et al. | |
| 2005/0135242 A1 | 5/2005 | Larsen et al. | |
| 2005/0172229 A1 | 8/2005 | Reno et al. | |
| 2005/0254653 A1 | 11/2005 | Potashnik et al. | |
| 2006/0168259 A1 | 7/2006 | Spilotro | |
| 2006/0168663 A1 | 7/2006 | Viljoen et al. | |
| 2006/0206709 A1 | 9/2006 | Labrou et al. | |
| 2006/0229996 A1 | 10/2006 | Keithley | |
| 2006/0235795 A1 | 10/2006 | Johnson et al. | |
| 2007/0011724 A1 | 1/2007 | Gonzalez et al. | |
| 2007/0067828 A1 | 3/2007 | Bychkov | |
| 2007/0074276 A1 | 3/2007 | Harrison et al. | |
| 2007/0077916 A1 | 4/2007 | Saito | |
| 2007/0079135 A1* | 4/2007 | Saito | G06F 21/35 713/183 |
| 2007/0094150 A1 | 4/2007 | Yuen et al. | |
| 2007/0157304 A1 | 7/2007 | Logan et al. | |
| 2007/0167171 A1 | 7/2007 | Bishop et al. | |
| 2007/0169174 A1 | 7/2007 | Critten | |
| 2007/0174904 A1* | 7/2007 | Park | H04L 63/0838 726/7 |
| 2007/0186095 A1* | 8/2007 | Ganesan | H04L 9/0822 713/155 |
| 2007/0198437 A1 | 8/2007 | Eisner et al. | |
| 2007/0250920 A1 | 10/2007 | Lindsay | |
| 2007/0279227 A1 | 12/2007 | Juels | |
| 2007/0283273 A1 | 12/2007 | Woods | |
| 2008/0028447 A1 | 1/2008 | O'Malley et al. | |
| 2008/0034216 A1* | 2/2008 | Law | H04L 9/3273 713/183 |
| 2008/0037536 A1* | 2/2008 | Padmanabhan | H04L 45/04 370/389 |
| 2008/0052180 A1 | 2/2008 | Lawhorn | |
| 2008/0109657 A1 | 5/2008 | Bejaj et al. | |
| 2008/0120707 A1 | 5/2008 | Ramia | |
| 2008/0137554 A1 | 6/2008 | Nandhra | |
| 2008/0172730 A1 | 7/2008 | Sandhu et al. | |
| 2008/0254765 A1 | 10/2008 | Eliaz | |
| 2008/0313719 A1 | 12/2008 | Kaliski, Jr. | |
| 2009/0037983 A1 | 2/2009 | Chiruvolu et al. | |
| 2009/0093300 A1 | 4/2009 | Lutnick et al. | |
| 2009/0106138 A1 | 4/2009 | Smith et al. | |
| 2009/0119754 A1 | 5/2009 | Schubert | |
| 2009/0119776 A1 | 5/2009 | Palnitkar et al. | |
| 2009/0132813 A1 | 5/2009 | Schibuk | |
| 2009/0232515 A1 | 9/2009 | Marien | |
| 2009/0235339 A1* | 9/2009 | Mennes | G06F 21/33 726/5 |
| 2009/0249076 A1 | 10/2009 | Reed et al. | |
| 2009/0249077 A1 | 10/2009 | Gargaro et al. | |
| 2009/0254572 A1 | 10/2009 | Redlich et al. | |
| 2009/0259588 A1* | 10/2009 | Lindsay | G06F 21/31 705/40 |
| 2009/0259848 A1 | 10/2009 | Williams et al. | |
| 2009/0265768 A1 | 10/2009 | Labaton | |
| 2009/0265776 A1 | 10/2009 | Baentsch et al. | |
| 2009/0288159 A1 | 11/2009 | Husemann et al. | |
| 2009/0307767 A1* | 12/2009 | Semba | G06F 21/34 726/18 |
| 2009/0328168 A1* | 12/2009 | Lee | G06F 21/34 726/6 |
| 2010/0017860 A1* | 1/2010 | Ishida | G06F 21/31 726/7 |
| 2010/0024022 A1 | 1/2010 | Wells et al. | |
| 2010/0041391 A1 | 2/2010 | Spivey et al. | |
| 2010/0131670 A1* | 5/2010 | Ishii | H04L 47/10 709/233 |
| 2010/0153540 A1 | 6/2010 | Li et al. | |
| 2010/0235897 A1* | 9/2010 | Mason | G06F 21/31 726/7 |
| 2010/0242104 A1 | 9/2010 | Wankmueller et al. | |
| 2010/0262834 A1 | 10/2010 | Freeman et al. | |
| 2010/0268831 A1 | 10/2010 | Scott et al. | |
| 2011/0047372 A1* | 2/2011 | Ganesan | H04L 63/061 713/155 |
| 2011/0072499 A1 | 3/2011 | Lin et al. | |
| 2011/0153496 A1 | 6/2011 | Royyuru | |
| 2011/0159848 A1 | 6/2011 | Pei et al. | |
| 2011/0161989 A1 | 6/2011 | Russo et al. | |
| 2011/0208801 A1 | 8/2011 | Thorkelsson et al. | |
| 2011/0265149 A1 | 10/2011 | Ganesan et al. | |
| 2011/0273551 A1 | 11/2011 | Yang et al. | |
| 2012/0005483 A1 | 1/2012 | Patvarczki et al. | |
| 2012/0124651 A1 | 5/2012 | Ganesan et al. | |
| 2012/0192255 A1* | 7/2012 | Ganesan | H04L 9/3215 726/6 |
| 2012/0272056 A1 | 10/2012 | Ganesan | |
| 2013/0133086 A1 | 5/2013 | Liberman et al. | |
| 2013/0165040 A1 | 6/2013 | McIntyre | |
| 2013/0232547 A1 | 9/2013 | Ganesan et al. | |
| 2013/0333006 A1* | 12/2013 | Tapling | G06F 21/42 726/6 |
| 2014/0020073 A1 | 1/2014 | Ronda et al. | |
| 2014/0298432 A1 | 10/2014 | Brown | |
| 2015/0156267 A1 | 6/2015 | Zhang | |
| 2015/0254672 A1 | 9/2015 | Huesch et al. | |
| 2016/0036777 A1 | 2/2016 | Bartlett | |
| 2016/0148597 A1 | 5/2016 | Hamid et al. | |
| 2016/0156620 A1 | 6/2016 | Ganesan | |
| 2017/0085635 A1 | 3/2017 | Nicholls | |
| 2017/0289172 A1 | 10/2017 | Turakhia | |

FOREIGN PATENT DOCUMENTS

| | | |
|---|---|---|
| JP | 2002-259344 | 9/2002 |
| JP | 2003-186838 | 7/2003 |
| JP | 2005-209083 | 8/2005 |
| JP | 2006-221440 | 8/2006 |
| JP | 2007-102777 | 4/2007 |
| JP | 2007-328381 | 12/2007 |
| JP | 2008-123461 | 5/2008 |
| JP | 2001175599 | 6/2011 |
| JP | 2013518348 | 5/2013 |

(56) References Cited

FOREIGN PATENT DOCUMENTS

| WO | 2007026486 | 3/2007 |
|---|---|---|
| WO | 2007103831 | 9/2007 |
| WO | 2007107868 | 9/2007 |

OTHER PUBLICATIONS

PCT International Search Report and Written Opinion issued in International Application No. PCT/US11/22482 dated Jan. 25, 2011.
International Search Report and Written Opinion, PCT/US2012/032840, dated Jun. 20, 2012.
Gralla, P. How the Internet Works, 2006, Que, pp. 346-347.
WOT*online). Agains Intuition Inc., 2006 [retrieved on Aug. 24, 2012). Retrieved from the *Internet: URL:web.archive.org/web/20061127233933/http://www.mywotcom/en/wot/help/wot_symbols_explained/, pp. 1-3.
Australian Office Action, dated Nov. 28, 2013, Australian Patent Application No. 2011209699.
Japanese Office Action, dated Dec. 9, 2013, Japanese Patent Application No. 2012-551244.
Australian Patent Examination Report No. 3, dated Jan. 22, 2014 in connection with the corresponding Patent Application No. 2011209699.
English Translation of Office Action in Japanese Patent Appln. No. 2013-536605, dated May 13, 2014.
International Search Report/Written Opinion, PCT/US2011/023525, dated Apr. 5, 2011.
International Search Report/Written Opinion, PCT/US2011/022486, dated Apr. 20, 2011.
International Search Report/Written Opinion, PCT/US2011/023528, dated Apr. 27, 2011.
International Search Report/Written Opinion, PCT/US2011/032295, dated Jun. 13, 2011.
International Search Report/Written Opinion, PCT/US2011/032271, dated Jul. 11, 2011.
Gueye et al., "Constraint-based geolocation of Internet hosts", copy provided in related U.S. Appl. No. 13/669,123.
IP2Location, copy provided in related U.S. Appl. No. 13/669,123; retrieved from http://www.ip2location.com.
Katz-Bassett et al., "Towards IP Geolocation Using Delay and Topology Measurements", copy provided in related U.S. Appl. No. 13/669,123.
Padmanabhan et al., "An Investigation of Geographic Mapping Techniques for Internet Hosts", copy provided in related U.S. Appl. No. 13/669,123.
Quova, "How we do it", http://www.quova.com/what/how-we-do-it, copy provided in related U.S. Appl. No. 13/669,123; retrieved from http://www.quova.com/what/how-we-do-it/.
Wikipedia, "Geolocation Software", copy provided in related U.S. Appl. No. 13/669,123; retrieved from http://en.wikipedia.org/wiki/Geolocation_software.
Non-Final Office Action dated Sep. 20, 2018 in related U.S. Appl. No. 15/422,137, all pages.

* cited by examiner

User Activity Log

| Time (Pacific) | Browsing Activity Log |
|---|---|
| 2010-01-26 19:43:13 | Seal gave "fins up" to merchant.neatsvcs.com |
| 2010-01-26 19:43:22 | Seal gave "fins up" to merchant.neatsvcs.com and one time password provided |
| 2010-01-26 19:43:31 | Seal gave "fins up" to merchant.neatsvcs.com and one time password provided to sign transaction "Pay Alice $40" |
| 2010-01-26 19:43:42 | Seal gave "fins up" to merchant.neatsvcs.com |
| 2010-01-26 19:43:47 | Seal gave "fins up" to merchant.neatsvcs.com and one time password provided |
| 2010-01-26 19:43:57 | Seal gave "fins up" to merchant.neatsvcs.com and one time password provided to sign transaction "Pay Alice $40" |
| 2010-01-26 19:44:06 | Seal gave "fins up" to merchant.neatsvcs.com |
| 2010-01-26 19:44:10 | Seal gave "fins up" to merchant.neatsvcs.com |
| 2010-01-26 19:44:15 | Seal gave "fins up" to merchant.neatsvcs.com |

METHOD FOR SECURE USER AND TRANSACTION AUTHENTICATION AND RISK MANAGEMENT

RELATED APPLICATIONS

This application is a continuation of U.S. patent application Ser. No. 14/330,025, filed Jul. 14, 2014, which is a continuation of U.S. patent application Ser. No. 13/011,739, filed Jan. 21, 2011, now U.S. Pat. No. 8,806,592, which is a continuation-in-part of U.S. patent application Ser. No. 13/011,587, filed Jan. 21, 2011, now U.S. Pat. No. 8,789,153, which claims priority based on Provisional U.S. Application Ser. No. 61/298,551, filed Jan. 27, 2010. The contents of the above identified applications are hereby incorporated herein in their entirety by reference.

TECHNICAL FIELD

This invention relates to security and privacy. More particularly it relates to user and transaction authentication and risk management.

BACKGROUND OF THE INVENTION

User authentication using techniques such as passwords, one time passwords, hardware or software smart cards, etc., have all proven to be either too weak and susceptible to man in the middle (MITM) or man in the browser (MITB) attacks, or else have proven too cumbersome and expensive. The use of single sign on techniques such as OpenID, FaceBook Connect, etc., only make the problem worse as once the attacker has compromised the master account they can now break into all other accounts that rely on that initial login. Further, the focus of attackers has shifted from trying to break the login process to using sophisticated techniques to come in after the act of login and to attack the transactions being performed. This has made transaction authentication, the act of confirming if the transaction seen at the back end web server is identical to that intended by the user, even more important.

Out of band authentication (OOBA), a technique by which a transaction is relayed to the user, and confirmation obtained, using an alternate form of communication, for instance by placing a voice phone call or a text message, is a promising alternative, but is also to inconvenient and costly to be used very often. It might be useful for the highest value transactions, or rare events like password resets, but using it for large number of transactions is too costly and cumbersome.

In prior work (see the related applications identified above), we described an innovation that addresses some of these problems. Specifically, we introduced the notion of the establishment of a security server that communicates with an independent pop-up window on the user's desktop that is being used to access the website. We described how this security server can alert the user, via communications to the pop-up as to the legitimacy of the web site the user is browsing via their browser. We also described how this pop-up window can provide a user with a one time password to enable login into the web site (i.e. authentication of the user to the website), based on a secret shared between the web site and the security server. Of particular utility in this invention was that it provided the security of one time passwords, but did not require a per user shared secret which all prior one time password systems have required.

The innovations described herein extend our prior work to provide for (i) transaction authentication, (ii) different hardware and software form factors as substitutes for the browser based pop up, and (iii) using accumulated login and transaction data as an input to a risk management engine.

OBJECTIVES OF THE INVENTION

This invention has the following objectives:
Develop a new transaction authentication technique that can be more ubiquitously applied to a larger number of transactions without compromising usability and cost.
Develop new pop up substitutes to communicate information such as transaction signatures.
Develop a technique for better risk management based on user activity information.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with certain aspects of the invention, a secure user signature can be provided on a network transaction, such as the user's purchase of a product from a vendor or movement of account funds from a bank or investment house, via a network, such as the Internet. The signature authenticates the user and confirms the transaction to the network site, which is sometimes referred to as a website, with which the user is transacting. To facilitate the signing of a transaction, a security server receives transaction information representing a transaction between a network user and a network site, directly from the network site. The transaction information could, for example, include a product description and price or an account identifier and amount of funds to be moved. The security server calculates a one-time-password (OTP) based on (i) the received transaction information and (ii) a secret shared by the security server and the network site, but not by the user. The security server then transmits the calculated one-time-password for application as the user's signature on the transaction, and hence as an authentication of the user and confirmation of the transaction to the network site. To validate the transmitted one-time-password, the network site independently calculates the one-time-password based on the shared secret and transaction information, and compares this to the one-time-password transmitted by the security server.

From a network site perspective, a user signature on a network transaction can be validated by the network site receiving, from a user network device, transaction information representing a transaction between a user and the network site. The network site transmits the transaction information directly to the security server. That is the transaction information is not sent to the security server via the user. The network site receives a one-time-password as the user's signature on the transaction, from the user network device. The network site calculates a one-time-password based on (i) the received transaction information and (ii) a secret shared by a security server and the network site, but not by the user. The network site then verifies the signature based on a comparison of the received one-time-password and the calculated one-time-password.

According to certain aspects of the invention, the one-time-password may be received by the network site from a network page associated with the network site and displayed on a network device associated with the user. As noted above, the transaction information could, for example, include transaction details relating to a product being purchased and its price or relating to bank accounts from and to which funds are being transferred and the amount of the transfer.

In one embodiment the security server transmits the calculated one-time-password to the same user network device as that displaying the network page, for presentation on a window, such as a web pop-up or custom application window, that is also displayed by that user network device, and for entry by the user, for example by cutting and pasting or typing, onto a displayed network page so as to be transmitted to the network site.

According to another embodiment of the invention, the network device which displays the network page is one (e.g. a first) user network device, for example a computer, such as a desktop computer. In this embodiment, the security server transmits the calculated one-time-password to another (e.g. a second) user network device, which different than the first user network device, for presentation on a window displayed by the second user network device and entry by the user onto the network page displayed by the first user network device. Here, because separate devices are being used, the user may, for example, be required to type the one-time-password presented on a window of the second user network device into the network page displayed on the first user network device. Preferably, the first and second user network devices are of different types. For example, if the first user network device is a computer, such as a desktop computer, the second type network device might be a personal mobile network device, such as a mobile smart phone or smart card.

According to still further aspects of the invention, where multiple different user network devices are utilized, the security server may receive a request of a network site to have the user authenticated for reasons unrelated to a particular transaction. In such a case, the security server calculates a one-time-password based on a secret shared by the security server and the network site, but not by the user. The security server transmits the calculated one-time-password to a window displayed on one network device of the user. The user can now enter the calculated one-time-password from the window displayed on the one network device onto the network page, e.g. a web page, associate with the network site and displayed on another user network device, to authenticate himself or herself to the network site. Of course, as discussed above, if a transaction is involved, the security server would preferably also receive transaction information as has been discussed above. In such a case, the one-time-password is calculated based also the transaction information.

From a network site perspective, to authenticate a user on a network, the network site transmits, directly to the security server, a request to have a user authenticated. In response, the network site receives a one-time-password from a network device of the user. The network site calculates a one-time-password based on a secret shared by the security server and the network site, but not by the user. By comparing the received one-time-password and the calculated one-time-password, the network site can authenticate the user.

PREFERRED EMBODIMENT(S) OF THE INVENTION

In prior work we had described how the introduction of a network based security server that has an independent channel to a user pop-up can be used in conjunction with a user's browser and the web site they are visiting to provide both web site and user authentication via a single user network device.

Our first new innovation is to extend this concept to transaction authentication. Specifically, when a web site receives a transaction from a user browser, which it wished to confirm, it sends the transaction information to the security server, which forwards the transaction information to the user pop-up along with a one time transaction signature which is computed based on a secret shared between the security server and the web server and on the transaction information. The user transfers this one time transaction signature to the web server via the browser, and the web server can recalculate the one time transaction signature, and if there is a match, can be assured that the user has confirmed the transaction.

Our second innovation is to extend the concept of a browser based pop up to different form factors. For instance the pop-up can be implemented as a smartphone app, as a dedicated part of a smartphone screen which is used only for this purpose, or it could be implemented as a smartcard.

Our third innovation is to take advantage of the fact that the pop-up (or its substitute) has a log of every user login and transaction. Currently risk engines watch user activity at a given web site to determine suspicious behavior. Or in some cases networks of web sites share such information. In other words data from the back-end systems is analyzed. In our system the pop-up's log of a user's login and transaction history provides a user centric front end way to capture this information and augment the capabilities of the risk engines.

We will first describe our preferred embodiment for transaction authentication.

Figure 1:
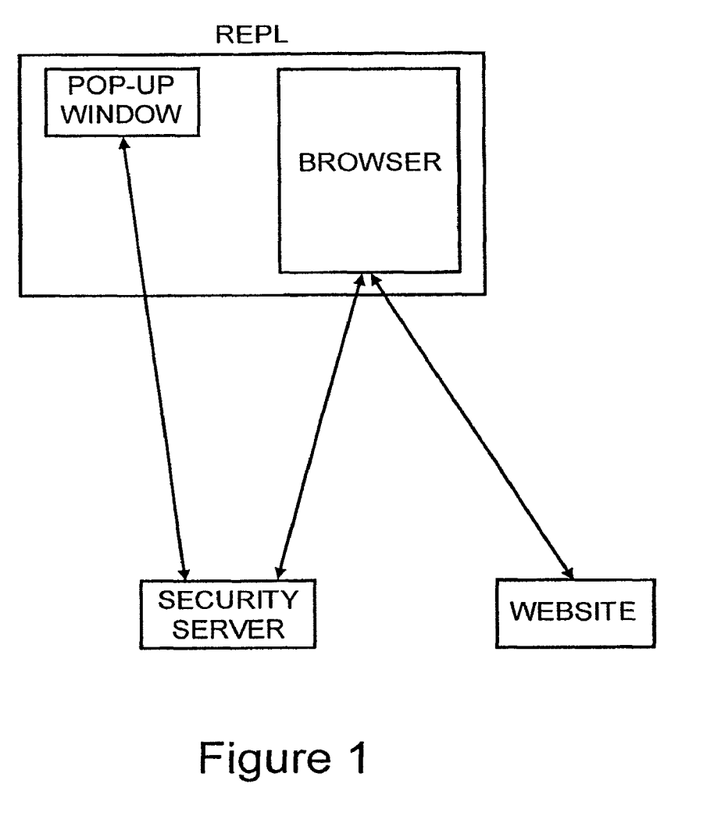
FIG. 1 depicts the main components of the system in accordance the parent application.
Figure 2:
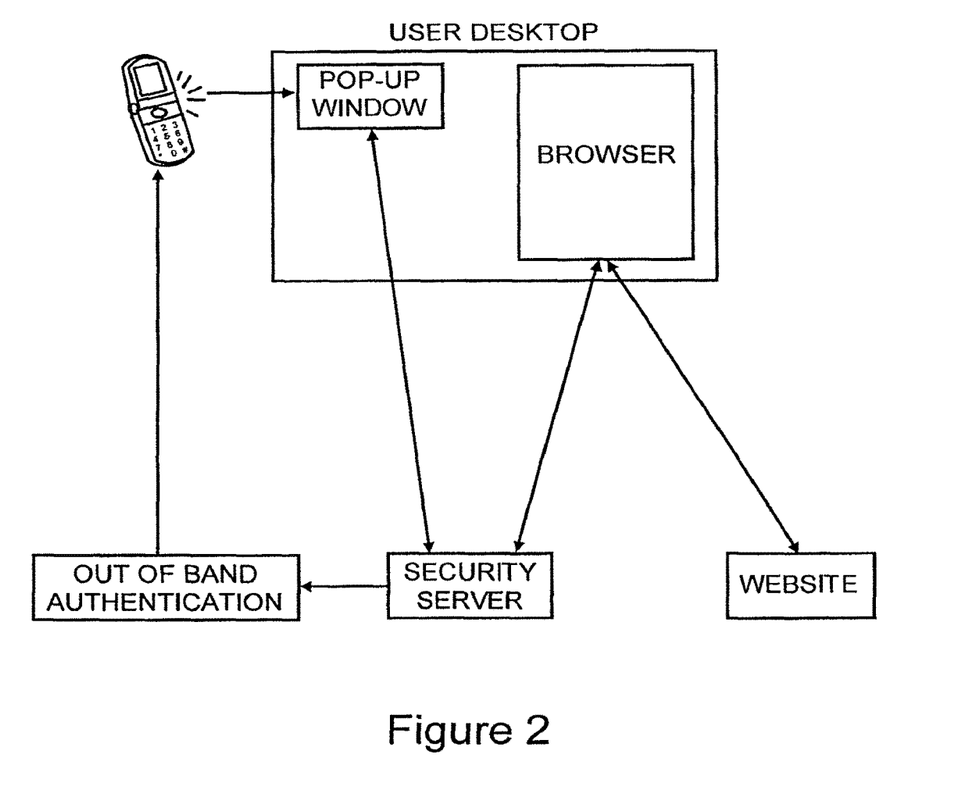
FIG. 2 shows the system augmented with user authentication, in this case achieved using out of band authentication, in accordance with the parent application.

As shown in FIGS. 1 and 2 the system consists of the following components:

A security server.
A pop-up window on the user's desktop.
A browser on the user's desktop.
The web site at which the user is performing the transaction.

As described in our prior work, the user will first go through a set up and personalization phase which is a one-time process, and will then start up or activate the pop up using a technique such as out of band authentication. At this point the security server will have an active communication channel open to the user which it identifies by some user identifier, for instance the phone number used for out for band authentication. Further, the web site at which the user is transacting and the security server would have previously agreed on a shared secret.

The user using the browser selects a transaction, e.g. "Pay Alice $100", which is transmitted by the browser to the web server. The web server transmits this transaction to the security server via the user's browser. The security server computes a one time transaction signature as a function of (i) the transaction details and (ii) the secret it shares with that particular web site. The security server then transmits this one time transaction signature to the user's pop-up window. The user cuts and pastes or otherwise copies this one time transaction signature into the web browser and the signature is transmitted back to the web site. The web site independently computes the transaction signature using the (i) the transaction details and (ii) the secret it shares with the security server, and compares it with the one received from the user. If the two signature's match then the web server can be assured that the security server saw the same transaction it sent (i.e. not a transaction manipulated en route to the security server), and since the security server is showing the user the transaction in an independent channel, user confirmation of the transaction is obtained.

In a second preferred embodiment we extend both our prior work regarding authentication, such as that described above in our first preferred embodiment, to the case where the pop-up is implemented in one of a variety of different form factors. One variety contemplates the pop-up window being on an application on a mobile device, another contemplates the window using a dedicated part of the display area of a personal mobile network device, such as a smart phone, and the last contemplates the pop-up window being embodied in dedicated hardware similar to that of a smartcard, which has communication capabilities. In all cases all functionality will work in exactly the same fashion, except that the user can no longer cut and paste the one time passwords used for authentication and would instead have to type them into the web browser operating on a different network device. These form factors provide additional layers of security simply by being independent of the user's desktop computer running the browser.

In either the first or second preferred embodiment as a user performs multiple logins and transactions the pop-up or its substitute has the ability to store a history or log of these events. Such data can then be fed to risk management engines which today only have access to patterns of user activity which they observe from one or more web sites.

In summary, as a first extension to our prior work, one innovation allows us to significantly strengthen the binding between the user, the security server acting as an Identity Provider and the website which is the Relying Party in the case of transactions made over a network, such as the purchase of a product by a user at the website. Here, like in our prior work, we assume that the security server and the web site have a priori agreed on a shared secret (the system is easily extended to use public key cryptography). Additionally, as shown in FIG. 2, we also assume that the user has used some method, for instance out-of-band authentication, to authenticate to the security server. When the user wishes to enter into a transaction at a website, such as the purchase of a product offered at the website or the transfer of funds from a bank account, the web site communicates transaction details (such as the type and amount of the transaction), which are presented both on a web page displayed to the user via the user's browser and on a pop-up window. Before proceeding with the transaction, the website requires authentication and confirmation of the transaction, or what is commonly referred to as a signature of the user on the transaction. Therefore, the web page additionally displays a blank for entry of the user's signature. Furthermore, the website also communicates a request for the user's signature on the identified transaction to the security server. The security server calculates a one-time-password as a function of (i) the secret it shares with the web site and (ii) the applicable transaction details displayed in the pop-up window, and displays the one-time-password to the user in the pop-up window. The user enters (perhaps by cutting and pasting) this one-time-password onto the web page, which serves as the user's signature on the transaction, which is thereby transmitted to the web site. The website confirms the authenticity of the signature by re-computing the one-time-password from the secret it shares with the security server and the transaction details. Here again, this system has all the security properties of one-time-passwords, yet has the tremendous advantage that it does not require a shared secret with each user, and it is only the security server and the web sites that need shared secrets for the purpose of generating one-time-passwords used as signatures on transactions. The actual one-time-password can, if desired, also be constructed based on a time stamp or a counter based OTP algorithm (in the way we use these algorithms the time or counter value needs to be communicated by the security server to the web site; or potentially computed deterministically using some agreed upon formula).

A further extension provides an application which allows the pop-up-window itself to reside on the user's smart phone, smart card or other small personal intelligent mobile network device, rather than on the network device, e.g. a desktop computer, being used to access the applicable website via its browser. For example, this is easily accomplished on a smart phone because the phone is already personalized and, in accordance with the techniques described above, does not need to store a special secret or execute one-time-password software. Rather, only the website and the security server share the necessary secret and only the security server generates the one-time-passwords required for user authentication and user signature.

Figure 3:
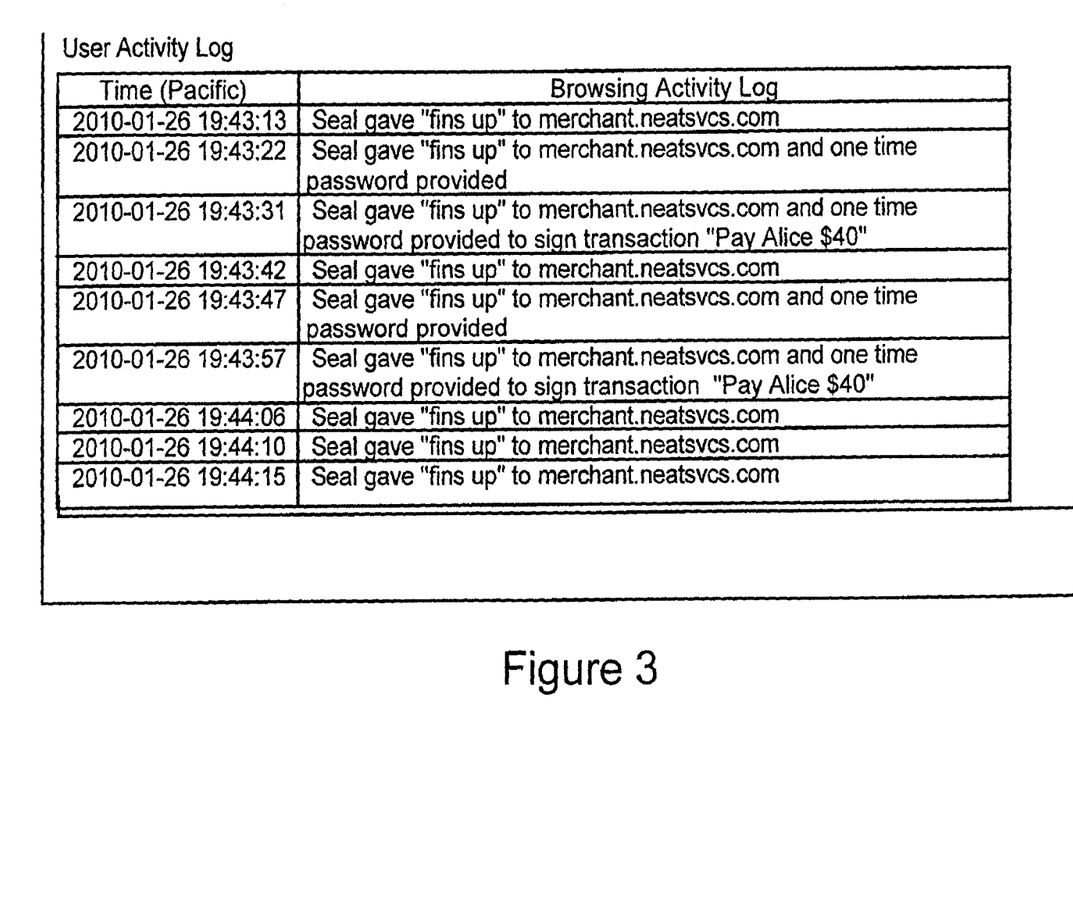
FIG. 3 depicts a log of network activities that can be maintained and used for augmented risk intelligence analysis, in accordance with the parent application.

Finally, a further innovation allows us to provide augmented risk intelligence analysis. In this regard, conventional risk analysis relies on data from websites. However, because of the flow of information, a log of data, such as one of the type shown in FIG. 3, capturing the user's activities while the pop-up window was active can be easily maintained. The log could, for example, be maintained by the security server website, and the user can access this log. If desired the user or the security server can compute the user's risk profile. Additionally, or alternatively, the logged data can be forwarded to a third party risk engine, where it can be married with data received from websites visited by the user so that the risk engine can provide the user with an augmented risk intelligence analysis.

In a further preferred embodiment, we extend both our prior work regarding authentication, to allow for direct communications of authentication requests and transaction information between the website and the security server.

Figure 4:
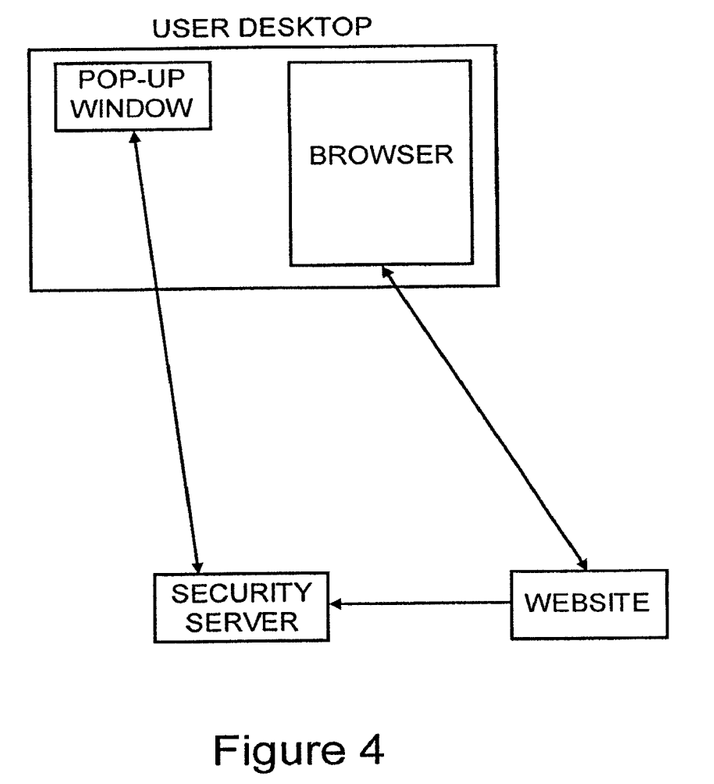
FIG. 4 depicts the main components of the system in accordance with the present invention.
Figure 5:
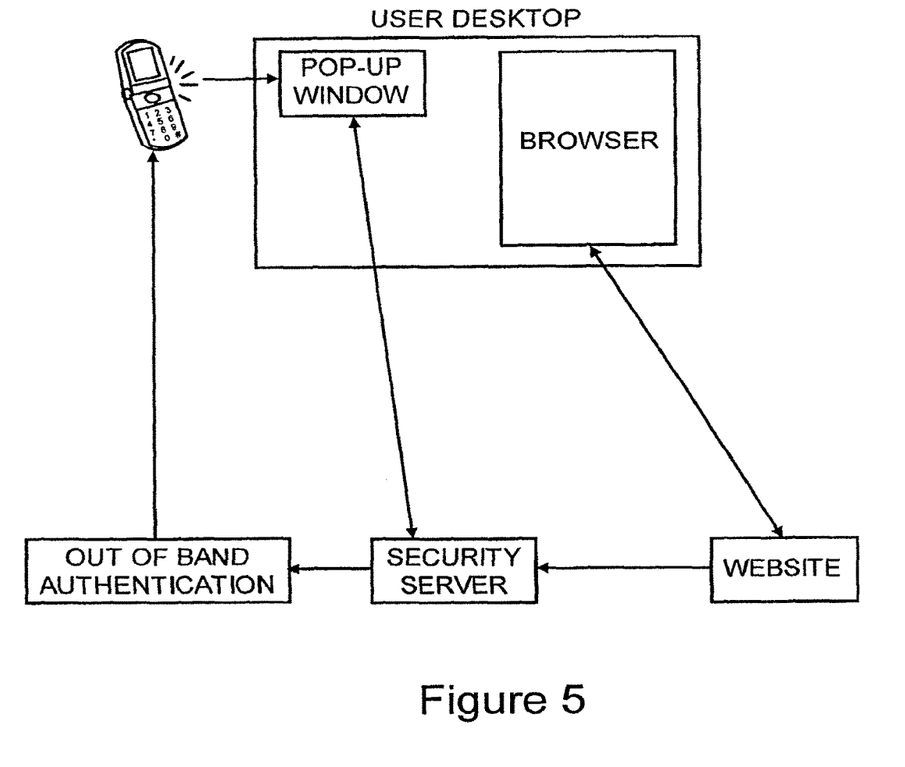
FIG. 5 shows the system augmented with user authentication, in this case achieved using out of band authentication, in accordance with the present invention.

As described in our prior work and with reference to FIGS. 4 and 5, the user will first go through a set up and personalization phase which is a one-time process, and will then start up or activate the pop up using a technique such as out of band authentication. At this point the security server will have an active communication channel or session open to the user which it identifies by some user identifier, for instance the phone number used for out of band authentication. Further, the web site at which the user is transacting and the security server would have previously agreed on a shared secret.

The user using the browser selects a transaction, e.g. "Pay Alice $100", which is transmitted by the user's browser) to the web server. The web server transmits this transaction to the security server via a direct link that has been established between the web site and the security server (rather than via the user's browser). The security server computes a one time transaction signature as a function of (i) the transaction details and (ii) the secret it shares with that particular web site. The security server then transmits this one time transaction signature to the user's pop-up window. The user cuts and pastes or otherwise copies this one time transaction signature into the web browser and the signature is transmitted back to the web site. The web site independently computes the transaction signature using the (i) the transaction details and (ii) the secret it shares with the security server, and compares it with the one received from the user. If the two signature's match then the web server can be assured that the security server saw the same transaction it sent (i.e. not a transaction manipulated en route to the security server), and since the security server is showing the user the transaction in an independent channel or session, user confirmation of the transaction is obtained.

As will be recognized by those skilled in the art, the pop-up can be implemented in one of a variety of different form factors. One variety contemplates the pop-up window being on an application on a mobile device, another contemplates the window using a dedicated part of the display area of a personal mobile network device, such as a smart phone, and the last contemplates the pop-up window being embodied in dedicated hardware similar to that of a smartcard, which has communication capabilities. In all cases all functionality will work in exactly the same fashion, except that the user can no longer cut and paste the one time passwords used for authentication and would instead have to type them into the web browser operating on a different network device. These form factors provide additional layers of security simply by being independent of the user's desktop computer running the browser.

What is claimed is:

1. A method of authenticating a user on a network, comprising:
   receiving, by a security server, a request of a network site to have a user authenticated and first information;
   generating, by the security server, a one-time-password, wherein the one-time-password is independently verifiable by the network site or the security server based on the first information, wherein:
      the one-time-password is generated as a function of a secret shared by the security server and the network site but not known to the user or associated with any particular user; and
      the secret shared by the security server and the network site comprises a predetermined value agreed upon by both the security server and the network site to be used for all users utilizing the enterprise; and
   transmitting over a network, by the security server to a window displayed on a remotely located first network device of the user, the one-time-password being for entry by the user onto a network page associated with the network site and displayed on a second network device of the user, and for subsequent verification by the network site to thereby authenticate the user.

2. The method of claim 1, wherein: the first user network device is of a type that is different than the second user network device.

3. The method of claim 1, wherein: the first user network device is a mobile smart phone; and the second user network device is a computer.

4. The method of claim 1, further comprising: storing, at the security server, a log of transactions between the user and the network site.

5. The method of claim 4, further comprising: computing, by the security server, a risk profile of the user based on the stored transactions log.

6. The method of claim 5, further comprising: transmitting, by the security server to a third party, the stored transactions log for risk analysis.

7. The method of claim 1, wherein the one-time password is based on a time stamp.

8. The method of claim 1, wherein the first information comprises the user's phone number.

9. The method of claim 1, wherein the user is authenticated using the one-time-password entered into the network site on the second network device.

10. A method of authenticating a user on a network site, comprising:
    transmitting, by a network site directly to a security server, a request to have a user authenticated;
    receiving first information directly from the security server;
    receiving, by a network page associated with the network site from a network device of the user, a one-time-password for authentication, wherein:
       the one-time-password is generated and transmitted over a network, by the security server to the network device of the user for presentation on a window displayed by the network device of the user and entry by the user onto the network page and displayed on another user network device;
       the network device of the user is remotely located from the security server;
       the one-time-password is generated as a function of a secret shared by the security server and the network site but not known to the user or associated with any particular user; and
       the secret shared by the security server and the network site comprises a predetermined value agreed upon by both the security server and the network site to be used for all users utilizing the enterprise;
    receiving, by the network site, the one-time-password which is based on the first information shared by the security server and the network site, but not by the user;
    receiving second information directly from the security server; and
    authenticating, by the network site, the user based on the second information.

11. The method of claim 10, wherein the shared secret is not associated with any particular user.

12. The method of claim 1, further comprising:
    receiving a request from a first user network device to perform a transaction,
    wherein the one-time password is received from a second user network device.

13. The method of claim 12, wherein the first user network device is of a type that is different than the second user network device.

14. The method of claim 13, wherein: the first user network device is a mobile smart phone; and the second user network device is a computer.

15. The method of claim 10, wherein the one-time password is based on a time stamp.

16. A method of authenticating a user on a network site, comprising:
   transmitting, by a network site directly to a security server, a request to have a user authenticated using a one-time password to be generated by the security server, and first information, wherein:
      the one-time-password is generated as a function of a secret shared by the security server and the network site but not known to the user or associated with any particular user; and
      the secret shared by the security server and the network site comprises a predetermined value agreed upon by both the security server and the network site to be used for all users utilizing the enterprise;
   receiving, by a network page associated with the network site from a network device of the user, the one-time-password generated by the security server, wherein the one-time-password is transmitted over a network, by the security server to the network device of the user for presentation on a window displayed by the network device of the user and entry by the user onto the network page and displayed on another user network device, wherein the network device of the user is remotely located from the security server; and
   authenticating, by the network site, the user based on the one time password.

17. The method of claim 16, further comprising:
   receiving a request from a first user network device to perform a transaction,
   wherein the one-time password is received from a second user network device.

18. The method of claim 17, wherein the first user network device is of a type that is different than the second user network device.

19. The method of claim 16, wherein the one-time password is based on a time stamp.

20. The method of claim 16, wherein the one-time-password is generated based on the first information shared by the security server and the network site, but not by the user.

* * * * *